(12) United States Patent
Hardt et al.

(10) Patent No.: US 9,703,655 B1
(45) Date of Patent: Jul. 11, 2017

(54) RECOVERY AFTER DATA LOSS IN A RELIABLE DISTRIBUTED COMPUTING SYSTEM

(71) Applicant: Scale Computing Inc., Los Altos, CA (US)

(72) Inventors: Nate Hardt, San Carlos, CA (US); Scott Loughmiller, San Francisco, CA (US); Philip White, San Carlos, CA (US)

(73) Assignee: Scale Computing Inc., Indianapolis, IN (US)

( * ) Notice: Subject to any disclaimer, the term of this patent is extended or adjusted under 35 U.S.C. 154(b) by 0 days.

(21) Appl. No.: 14/554,025

(22) Filed: Nov. 25, 2014

(51) Int. Cl.
*G06F 11/00* (2006.01)
*G06F 11/20* (2006.01)

(52) U.S. Cl.
CPC ...... *G06F 11/2058* (2013.01); *G06F 11/2094* (2013.01); *G06F 2201/815* (2013.01)

(58) Field of Classification Search
USPC .......................................................... 714/6.1
See application file for complete search history.

(56) References Cited

U.S. PATENT DOCUMENTS

| | | | | |
|---|---|---|---|---|
| 4,930,128 A * | 5/1990 | Suzuki | ............. | G06F 12/08 714/16 |
| 5,701,502 A * | 12/1997 | Baker | ............. | G06F 13/368 709/201 |
| 6,073,209 A * | 6/2000 | Bergsten | ............. | G06F 3/0619 707/999.202 |
| 6,973,556 B2 * | 12/2005 | Milligan | ............. | G06F 17/30353 707/999.1 |
| 7,093,086 B1 * | 8/2006 | van Rietschote | ... | G06F 11/1438 711/161 |
| 7,130,973 B1 * | 10/2006 | Chong, Jr. | ............. | G06F 11/1662 711/112 |
| 7,444,459 B2 * | 10/2008 | Johnson | ............. | G06F 9/455 711/154 |
| 8,161,321 B2 * | 4/2012 | Zheng | ............. | G06F 11/1466 707/674 |
| 8,225,039 B2 * | 7/2012 | Kawaguchi | ............. | G06F 3/0605 711/114 |
| 8,397,047 B2 * | 3/2013 | Ogihara | ............. | G06F 3/0607 711/105 |
| 8,458,422 B1 * | 6/2013 | Holdman | ............. | G06F 3/0605 711/162 |
| 8,996,809 B2 * | 3/2015 | Quan | ............. | G06F 12/08 711/118 |
| 9,052,809 B2 * | 6/2015 | Vesto | ............. | G06F 3/0486 |

(Continued)

*Primary Examiner* — Amine Riad
(74) *Attorney, Agent, or Firm* — Steven Swernofsky

(57) ABSTRACT

Real system devices (RSD's) emulate virtual system devices (VSD's); system elements can use RSD's and manipulate VSD's, while users can only use VSD's. Identifying when RSD's have erroneous data. Providing a mapping of RSD's to VSD's, to recover a maximum set of VSD's. Providing a mapping of VSD's to RSD's, to recover a specified most valuable VSD. Reconstructing VSD's from RSD's having erroneous data, and coordinating with a user's assistance to couple RSD's in an order allowing data recovery. Metadata is maintained coupling data identifiable on VSD's with corresponding data on RSD's; it is possible to trace connections between RSD's and VSD's even without complete data.

5 Claims, 2 Drawing Sheets

(56) References Cited

U.S. PATENT DOCUMENTS

| | | | |
|---|---|---|---|
| 9,116,633 B2* | 8/2015 | Sancheti | |
| 9,250,823 B1* | 2/2016 | Kamat | G06F 3/0647 |
| 9,262,437 B2* | 2/2016 | Nakagawa | G06F 17/30194 |
| 9,274,907 B1* | 3/2016 | Bachu | G06F 11/2094 |
| 2002/0087673 A1* | 7/2002 | Selkirk | G06F 11/1076 709/223 |
| 2008/0104443 A1* | 5/2008 | Akutsu | G06F 11/2058 714/6.12 |
| 2010/0153947 A1* | 6/2010 | Haruma | G06F 9/45558 718/1 |
| 2011/0191639 A1* | 8/2011 | Shinohara | G06F 11/0727 714/54 |
| 2012/0182992 A1* | 7/2012 | Cowart | H04L 45/22 370/392 |
| 2013/0159765 A1* | 6/2013 | Hiramatsu | G06F 11/1435 714/6.1 |
| 2013/0198559 A1* | 8/2013 | Keith, Jr. | G06F 11/201 714/4.11 |
| 2013/0275802 A1* | 10/2013 | Endo | G06F 11/1076 714/6.23 |
| 2015/0331744 A1* | 11/2015 | Slik | H04L 67/1095 714/764 |

\* cited by examiner

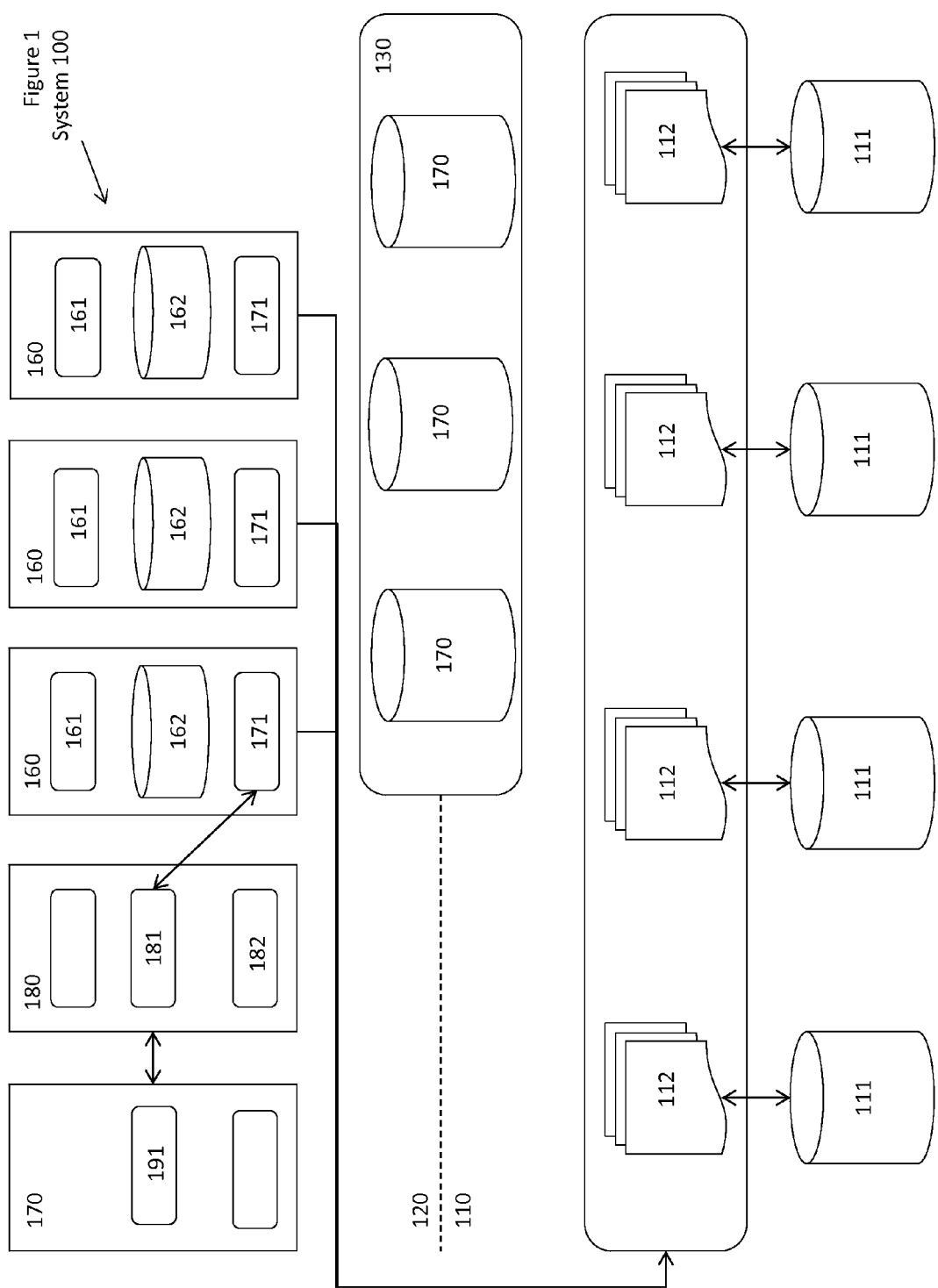

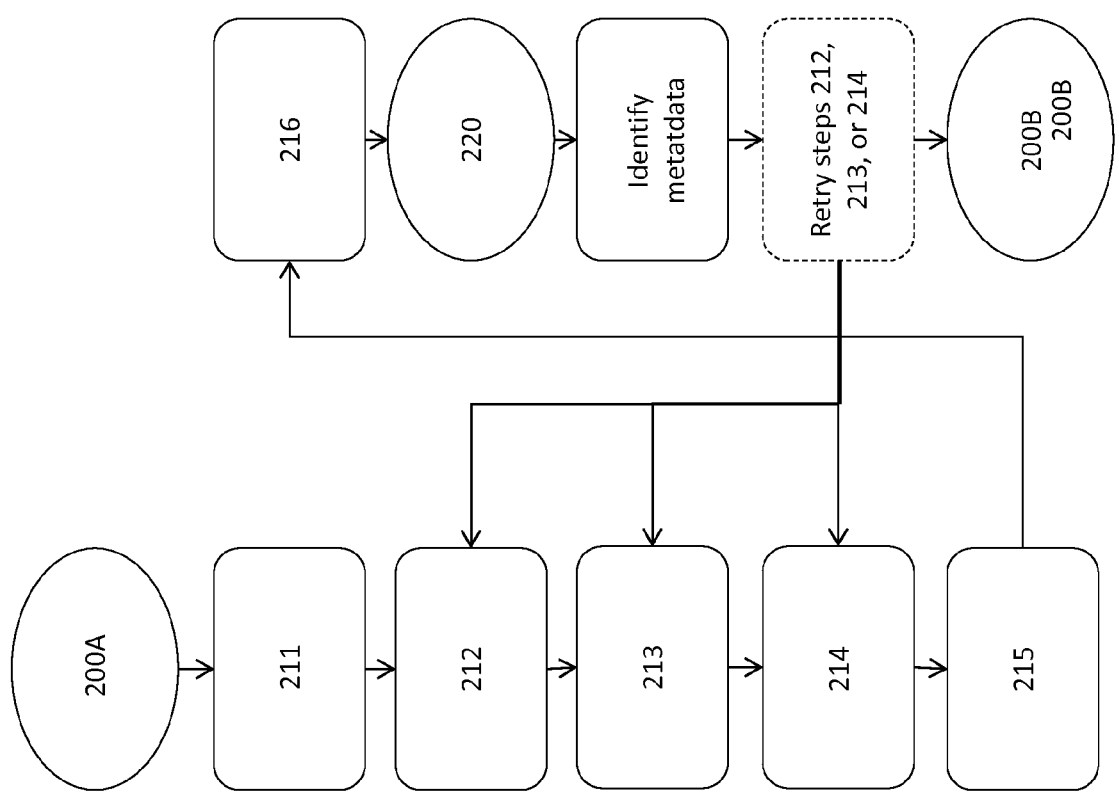

RECOVERY AFTER DATA LOSS IN A RELIABLE DISTRIBUTED COMPUTING SYSTEM

INCORPORATED DISCLOSURES

This Application describes technologies that can be used with inventions, and other technologies, described in one or more of the following Applications, each assigned to the same assignee:

Application 61/909,118, filed Nov. 26, 2013, in the name of Scott Loughmiller and Philip White, titled "Reduplication of de-duplicated files in a fault-tolerant distributed cluster".

Application 61/909,301, filed Nov. 26, 2013, in the name of Aaron Pagel and Nate Hardt, titled "Resource management in a virtual machine cluster".

Application 61/909,336, filed Nov. 26, 2013, in the name of Aaron Pagel and Nate Hardt, titled "Resource management in a virtual machine cluster".

Application 61/909,342, filed Nov. 26, 2013, in the name of Aaron Pagel and Nate Hardt, titled "Resource management in a virtual machine cluster".

Application 61/909,344, filed Nov. 26, 2013, in the name of Nate Hardt, Scott Loughmiller, and Philip White, titled "Unanticipated operational requirements in a reliable distributed computing system".

Application 61/909,365, filed Nov. 26, 2013, in the name of Nate Hardt, Scott Loughmiller, and Philip White, titled "Recovery after data loss in a reliable distributed computing system".

Application 61/909,352, filed Nov. 26, 2013, in the name of Nate Hardt, Scott Loughmiller, and Philip White, titled "Metadata caches in a reliable distributed computing system".

Application 61/909,356, filed Nov. 26, 2013, in the name of Nate Hardt, Scott Loughmiller, and Philip White, titled "Remote access latency in a reliable distributed computing system".

Application 62/080,773, filed Nov. 17, 2014, in the name of Clint McVey and Scott Loughmiller, titled "Zero memory buffer copying in a reliable distributed computing system".

Application 62/080,791, filed Nov. 17, 2014, in the name of Nate Hardt, Scott Loughmiller, and Philip White, titled "Virtual devices in a reliable distributed computing system".

Application No. 62/123,740, filed Nov. 24, 2014, in the name of Scott Loughmiller, Philip White, Aaron Pagel, Nate Hardt, and Clint McVey, titled "Reliable Independent Block Engine and State Machine".

Each and every one of these documents, as well as all documents cited therein, are hereby incorporated by reference as if fully recited herein.

This Application claims priority of the Incorporated Documents, and to each and every document cited therein, to the fullest extent possible.

No aspect of incorporating these documents by reference is intended to be limiting in any way. The scope and spirit of the invention remains as broad as possible, given the specification and original claims of this Application. These Incorporated Documents are additive in nature, and can be combined with the technical matter described herein, in whole or in part.

RELATED APPLICATIONS

This Application describes technologies that can be used with inventions, and other technologies, described in one or more of the following Applications, each assigned to the same assignee:

U.S. Provisional Application 61/651,391, filed May 24, 2012, in the name of inventors Jason Collier, Scott Loughmiller, and Philip White, titled "Unified hypervisor and distributed fault-tolerant storage".

U.S. application Ser. No. 13/901,325, filed May 23, 2013, in the name of inventors Jason Collier, Scott Loughmiller, and Philip White, titled "Unified hypervisor and distributed fault-tolerant storage".

U.S. application Ser. No. 14/229,748, filed Mar. 28, 2014, in the name of inventors Philip White, and Hank Hsien, titled "Placement engine for a block device".

U.S. application Ser. No. 14/318,414, filed Jun. 27, 2014, in the name of inventors Philip White, titled "Shared reference counters among a plurality of virtual storage devices".

U.S. application Ser. No. 14/320,427, filed Jun. 30, 2014, in the name of inventors Philip White, titled "Efficient migration of virtual storage devices to a remote node using snapshots".

Each and every one of these documents, as well as all documents cited therein, are hereby incorporated by reference as if fully recited herein.

This Application claims priority of the Incorporated Documents, and to each and every document cited therein, to the fullest extent possible.

No aspect of incorporating these documents by reference is intended to be limiting in any way. The scope and spirit of the invention remains as broad as possible, given the specification and original claims of this Application. These Incorporated Documents are additive in nature, and can be combined with the technical matter described herein, in whole or in part.

BACKGROUND

Field of the Disclosure

This application generally relates to data distribution, data loss, recovery, reliable computing systems, distributed computing systems, and other matters.

Background of the Disclosure

In storage systems, it can sometimes occur that storage devices can lose data, or metadata, with the effect that data important to the user might be lost. In a storage system used with virtual machines (VM's), it can be advantageous to separate virtual storage devices (VSD's) from the devices that emulate them, real storage devices (RSD's). In such cases, users and their guest operating systems (guest OS's) perceive storage as unitary data blocks maintained reliably on the VSD's, while host operating systems (host OS's) and other system elements perceive both the VSD's, and also the RSD's used to emulate those VSD's. If an RSD loses all or part of a data block, and that discovery is not made until later, it can sometimes occur that reconstructing any particular VSD from RSD's known to have good data can be infeasible without assistance.

Each of these issues, as well as other possible considerations, might cause difficulty in aspects of operating computing systems, particularly in those computing systems in which virtual machines are implemented, or in computing systems making use of distributed resources.

BRIEF SUMMARY OF THE DISCLOSURE

This application provides techniques by which one or more of: (1) a user can reconstruct as many VSD's as possible from RSD's with known good data blocks, or (2) a user can designate a particular VSD and recover as much of that VSD as possible. Metadata is maintained coupling data identifiable on VSD's with corresponding data on RSD's, with the effect that it is possible to trace connections back and forth between VSD's and RSD's even without complete data. The user, working with assistance, can determine what data is most valuable to recover, and which RSD's need to be replaced, and in what order, to recover that data.

In one embodiment, the system can identify, with respect to those RSD's with known good data, a relative maximum of data recoverable on VSD's, and in what order those RSD's should be coupled to the system to recover that data. This has the effect that the system identifies, from RSD's with known good data, which VSD's are recoverable. The system identifies one or more VSD's whose data is recoverable, identifies the RSD's that maintain the metadata and data blocks for those VSD's, and in what order those RSD's should be coupled to the system to conduct recovery. At those times when data is needed from RSD's that are not the currently coupled to the system, the system identifies those RSD's to the user, identifies in which disk slot they are relatively better positioned, and confirms when the user couples those RSD's to the system. This has the effect that the system and the user can work together to recover a relative maximum of available data.

In one embodiment, the user can obtain assistance with respect to one or more particular VSD's selected by the user as being of relatively higher priority. This has the effect that the system identifies, from VSD's desired by the user, which RSD's are needed to recover a relative maximum with respect to those VSD's. As in one embodiment described above, the system identifies the RSD's that maintain the metadata and data blocks for those VSD's, in what order those RSD's should be coupled to the system to conduct recovery, advises the user at those times when data is needed from not-then-coupled RSD's, and confirms when the user couples those RSD's to the system. This has the effect that the user and the system can work together to recover a relative maximum of data that the user most desires.

After reading this application, those skilled in the art would recognize that techniques shown in this application are applicable to more than just the specific embodiments shown herein. For a first example, the concepts of RSD's and VSD's are intended to be broad, and can include any system in which a set of generally user-accessable data is implemented using a set of generally user-inaccessable data. This is independent of whether such a system involves multiple cooperating devices, or a portion of one or more devices operating to embody RSD's and having other functions besides, or otherwise. For a second example, the concepts of reconstruction and recovery are intended to be broad, and can include any system in which spread across a medium with at least some redundancy, including one or more of: backup or multiple copies, error-correcting codes, spread-spectrum encodings, or otherwise.

While multiple embodiments are disclosed, including variations thereof, still other embodiments of the present application will become apparent to those skilled in the art from the following detailed description, which shows and describes illustrative embodiments of the application. The application is capable of modifications in various aspects, all without departing from its scope or spirit. The drawings and detailed description are illustrative in nature and not restrictive.

BRIEF DESCRIPTION OF THE FIGURES

FIG. 1 shows a conceptual drawing of a system.
FIG. 2 shows a conceptual drawing of a method.

DETAILED DESCRIPTION

Terms and Phrases

The following definitions are intended to be exemplary and illustrative, not necessarily limiting:

The phrase "real storage device," the term "RSD," and variants thereof, generally refer to any physical device with which the computer system can communicate.

The phrase "virtual storage device," the term "VSD," and variants thereof, generally refer to any virtual device whose capabilities are emulated by a host operating system or virtual machine.

The term "metadata," and variants thereof, generally refers to any additional information associated or involved with data use in either RSD's or VSD's.

The terms "reconstruct," "recover," and variants thereof, generally refer to any technique associated or involved with obtaining useful data in response to data known to include errors.

The term "user," and variants thereof, generally refers to any entity external to those systems described herein that maintain data, and can include one or more persons acting individually or collectively, or any other entity capable of carrying out the activities ascribed to or associated with the user described herein.

Figures and Text

FIG. 1 shows a conceptual drawing of a system.
FIG. 2 shows a conceptual drawing of a method.

System Overview

FIG. 1 shows a conceptual drawing of a system.

A system 100 includes elements described herein, other elements shown in the figure, and possibly other elements. In one embodiment, the system 100 includes two or more redundant nodes; however, the figure only shows one of those nodes. This one of multiple nodes is also in communication with those other nodes, with the effect of providing a reliable distributed computer system. As the multiple nodes frequently communicate the content of their memory and storage devices, the system 100 can be considered as if it were a distributed computer system with multiple real storage devices (RSD's) and a shared memory, each accessible to all processors of each individual redundant node. Accordingly, the figure should be considered to represent a distributed computer system with a shared memory and a set of shared RSD's.

Kernel Elements

The system 100 can include a kernel 110, that can include a set of kernel elements, or in addition to or in lieu thereof, a set of elements operating at a kernel level of authorization. The system 100 can also include a userspace 120, that can include a set of user elements, or in addition to or in lieu thereof, a set of elements operating at a user level of authorization (other than the kernel level of authorization).

The kernel 110 can be managed by a Linux kernel, and can include one or more real storage devices (RSD's) 111. While this application primarily describes RSD's 111 as storage devices, it is alternatively possible that they are other types of devices. For a first example, RSD's 111 could be network interface cards (NIC's), or any other suitable device, coupled to the kernel 110 using an iSCSI interface. For a second example, RSD's 111 could be another other device capable of operating as described herein.

As described herein, in one embodiment, RSD's 111 can include disk drives or other mass storage devices, such as SSD drives or otherwise, and can each be associated with a device queue 112. The device queue 112 can include instructions from a user in the userspace 120 (authorized by user access to the kernel, and sanitized by the kernel), and can include data to be written, locations of where to place data to be read, read/write instructions, responses to read/write instructions, and possibly error messages. As further described herein, the RSD's 111 and the device queues 112 can be managed by an I/O Manager (as further described herein) that provides user access to the kernel through a kernel access port 113.

The system 100 also includes at least some shared memory 110 (optionally, each individual node can include some non-shared memory). The shared memory 110 is shown in the figure as being on the border between kernel-accessible memory 120 and user-accessible memory 130, as the shared memory 110 can be accessed by either user resources or kernel resources. The distinction between user resources and kernel resources is further described herein.

Virtual Machines

The system 100 also can include one or more virtual machines (VM) 160, each including a guest operating system (guest OS) 161 and a host operating system (host OS), the latter including a set of drivers and indicated as Qemu 162. Each of the one or more guest OS's 161 can call on one or more of the drivers associated with its own copy of Qemu 162. Its Qemu 162 can include device drivers for virtual storage devices (VSD's) 170, each of which emulates a real-world storage device, although not necessarily a real-world storage device that is actually manufactured and sold.

While this application primarily describes VSD's 170 as storage devices, it is alternatively possible that they are other types of virtual devices. For a first example, VSD's 170 could be network interface cards (NIC's), or any other suitable device, coupled to its Qemu 162 using an iSCSI interface. For a second example, VSD's 170 could be another other device capable of operating as described herein.

Upon receiving an instruction to read/write, from/to, one or more VSD's 170, its Qemu 162 sends that instruction to a block driver element in the hypervisor that is managing its Qemu 162. That block driver element sends the instruction to a libscribe element 171, that performs the work of reading/writing data from/to the one or more RSD's 111 associated with those one or more VSD's 170. The libscribe element 171 is shown coupled to the RSD's 111 and their device queues 112, but in reality, the libscribe element 171 operates using a scribed daemon 180, and in particular, a libscribe server 181 within that scribed daemon 180.

"Scribed" Server

Accordingly, the libscribe element 171 sends the read/write instruction to the scribed daemon 180, an in particular, to the libscribe server 181 that can be included in the scribed daemon 180. (The scribed daemon 180 can operate using a scaled daemon 190, and in particular, a state machine 191 in the scaled daemon 190.) The libscribe server 181 sends the read/write instructions to an I/O Manager 182, which can be granted authorization to access selected portions of the kernel element 110, such as using a port 183.

The I/O Manager 182, using the port 183, can call upon the kernel element 110 to send the read/write instructions to the RSD's 111 and their device queues 112, where they can be executed and responded to. The I/O Manager 182, using the port 183, can obtain responses to the read/write instructions from the RSD's 111 and their device queues 112. The I/O Manager 182 can return those responses to the libscribe server 181, which can return them to the libscribe element 171, which can return them to the associated Qemu 162, which can return them to the associated guest OS 161.

This has the effect that the guest OS 161, which attempts to issue read/write instructions to a VSD 170, instead has those read/write instructions rewritten and redirected to one or more RSD's 111, upon which the data and metadata for that VSD 170 are stored.

Method of Operation

FIG. 2 shows a conceptual drawing of a method.

A method 200 includes flow points and method steps as described herein. These flow points and method steps are, by the nature of the written word, described in a particular order. This description does not limit the method to this particular order. They might be performed in a different order, or concurrently, or partially concurrently, or otherwise in a parallel, pipelined, quasi-parallel, or other manner. They might be performed in part, paused, and returned to for completion. They might be performed as co-routines or otherwise. In the context of the invention, there is no particular reason for any such limitation.

One or more portions of the method 200 are sometimes described as being performed by particular elements of the system 100 described with respect to FIG. 1, or sometimes by "the method" itself. When a flow point or method step is described as being performed by "the method," it can be performed by one or more of those elements, by one or more portions of those elements, by an element not described with respect to the figure, by a combination or conjunction thereof, or otherwise.

Beginning of Method

A flow point 200A indicates a beginning of the method. A user has encountered an error with an RSD 111 or a VSD 170, and wishes to recover important data after the error.

Identifying Metadata

At a step 211, the system 100 attempts to identify metadata associating RSD's 111 with each VSD 170. As part of this step, once the system 100 identifies metadata associating RSD's 111 with each VSD 170, the system 100 identifies which data blocks from each VSD 170 can be found at which RSD 111.

After reading this application, those skilled in the art will see that each VSD 170 is associated with at least two RSD's 111, as each data block on each VSD 170 is maintained in two separate places, with the effect of preventing any RSD 111 from being a single point of failure. After reading this application, those skilled in the art will also see that each RSD 111 is very likely to be associated with more than one VSD 170, as otherwise that RSD 111 would be maintaining data for a single VSD 170; this both might be risky and might overly concentrate disk operations for that particular VSD 170 on that particular RSD 111.

At a step 212, the system 100 attempts to identify metadata associating VSD's 170 with each RSD 111. As part of this step, once the system 100 identifies metadata associating VSD's 170 with each RSD 111, the system 100 identifies which data blocks at each RSD 111 are supporting which VSD's 170.

At a step 213, having identified which blocks at which RSD's 111 are associated with which VSD's 170, and which blocks at which VSD's are associated with which RSD's 111, the system 100 determines a direct connection graph between RSD's 111 and VSD's 170. A direct connection graph can include a set of directed links between points (in this case, always between an RSD 111 and a VSD 170, or the reverse), and can be represented as an RSD×VSD matrix, with a logical "1" for a connection and a logical "0" for a lack of a connection.

At a step 214, the system 100 interacts with a user, such as by means of a user interface, to request whether the user would like to give priority to any one or more particular VSD's 170. As part of this step, if the user does wish to give priority to any one or more VSD's 170, the system 100 requests in what order the user desires to give priority. In one embodiment, the user's priority ordering of VSD's 170 can take the form of grouping VSD's 170 into equivalence classes of priority: Thus, class (1)>class (2)> . . . class (N), where the user desires to give priority to those VSD's 170 in class (1), followed by those VSD's 170 in class (2), and so on.

At a step 215, the system 100 determines what blocks, and in what order, it will need to recover the VSD's 170 in class (1), followed by class (2), . . . , followed by class (N). It is possible that some of those blocks are corrupted, or that data has otherwise been lost, so the system 100 might have to look for mirror copies of some of those data blocks, and the system 100 might have to accept that some portions of some VSD's 170 might not be recoverable. It is also possible that some of those blocks are identified as being on RSD's 111 that are not coupled to the system 100, that is, those disks have been removed from their disk slots and are either filed somewhere or in use for some other purpose, and the system 100 might have to ask the user to recouple/replace those RSD's 111.

At a step 216, the system 100 interacts with the user, such as by means of the user interface, to present the one or more possible routes toward recovering the user's preferred VSD's 170, how much of those VSD's 170 can be recovered, and how much of each one or more VSD's 170 are affected by each particular RSD 111.

In a first example, it is possible that the user will know which RSD 111 has lost data, because (say) the user is physically present and holding a smoking burnt-out RSD 111, or because (say) the user has been able to rescue only a limited number of RSD's 111 from a catastrophic event, such as a flood. In such cases, the user might wish to know what VSD's 170, or portions thereof, have been lost, or can be recovered, given the knowledge the user has about which RSD's 111 are available. For example, the user might be a field engineer sent to recover as much data as possible after a major data loss.

In a second example, it is possible that the user will know which VSD's 170 are especially desired, because (say) the user has stored important information on those VSD's 170. In such cases, the user might wish to know what RSD's 111, or portions thereof, need to be found and recoupled/replaced in the system 100 to obtain that important information. For example, the user might be a field engineer sent to recover at least one item of important information, on a known particular VSD 170, after a major data loss.

At a flow point 220, the user has indicated to the system 100 which of the one or more possible routes toward data recovery the user prefers.

At a step 221, the system 100 begins recovering data according to the plan approved by the user. As part of this step, the system 100 rebuilds the tree-structure for the file system, re-creating and re-inserting metadata at appropriate data blocks, wherein the metadata identifies appropriate data blocks to recover as much of the data desired by the user, in the order of preference expressed by the user. When the system 100 needs to access an RSD 111, or a portion thereof, that is not then coupled to the system 100, the system 100 interacts with the user, by means of the user interface, to request that RSD 111, to indicate which disk slot into which the user should insert it, and to confirm that the user has selected the correct RSD 111.

As part of rebuilding the file system, the system 100 might have to write data blocks out to one or more RSD's 111. In so doing, the system 100 selects those data blocks used to emulate those VSD's 170 that the user has indicated are of least importance or no importance (for example, they could have been empty before starting the process).

At periodic intervals, or when requested by the user, or when completing a priority class of data important to the user, the system 100 can return to the steps 212, 213, or 214, to re-evaluate how best to accomplish the priorities it obtained by interaction with the user. Otherwise, the system 100 continues with the flow point 200B.

End of Method

At a flow point 200B, the method 200 is completed, and halts.

Alternative Embodiments

While some embodiments are generally described herein with respect to data recovery when real devices emulate virtual devices, and user programs are prevented access to those real devices, in the context of the invention, there is no particular requirement for any such limitation. For example, individual elements or method steps of the described embodiments could be replaced with substitutes that perform similar functions in other contexts. Examples of such contexts can include any system in which information is transferred between processes (or threads) with differing security authorization.

While some embodiments are generally described herein with respect to recovery of data storage, in the context of the invention, there is no particular requirement for any such limitation. For example, individual elements or method steps of the described embodiments could be replaced with substitutes that perform similar functions in other contexts. Examples of such contexts can include any system involving data transfers, such as a system that transfers a collection of multiple data packets.

Elements of the system are described herein with respect to one or more possible embodiments, and are not intended to be limiting in any way. In the context of the invention, there is the particular requirement for any such limitations as described with respect to any elements of the system. For example, individual elements of the described apparatuses could be replaced with substitutes that perform similar functions. Moreover, as described herein, many individual elements of the described apparatuses are optional, and are not required for operation.

Although control elements of the one or more described apparatuses are described herein as being executed as if on a single computing device, in the context of the invention, there is no particular requirement for any such limitation. For example, the control elements of the one or more described apparatuses can include more than one computing device, not necessarily all similar, on which the element's functions are performed.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure and the inventive subject matter.

The invention claimed is:

1. A method,
in a reliable distributed computing system, said system including one or more virtual machines, each said virtual machine having access to a plurality of virtual storage devices, each said virtual machine operating under the control of a guest operating system,
of recovering a largest amount of data after a loss of data in one or more virtual storage devices,
said method including steps of
maintaining metadata associating one or more said real storage devices with one or more said virtual storage devices;
after said loss of data, in response to said metadata, receiving an instruction from a user selecting one of: an instruction to recover a set of particular virtual storage devices, an instruction to recover a largest number of virtual storage devices;
when said instruction from the user includes said instruction to recover a set of particular virtual storage devices, determining a set of real storage devices from which to recover a largest number of file storage units associated with those particular virtual storage devices, and determining an order in which to couple said set of real storage devices to the reliable distributed computing system;
when said instruction from the user includes said instruction to recover a largest number of virtual storage devices, determining a set of real storage devices from which to recover a largest number of said virtual storage devices, and determining an order in which said set of real storage devices should be coupled to the reliable distributed computing system;
informing said user of which real storage device to next couple to the reliable distributed computing system;
reading still-good data from said real storage device that was next coupled;
when said instruction from the user includes said instruction to recover a set of particular virtual storage devices, reconstructing the particular virtual storage device;
when said instruction from the user includes said instruction to recover a largest number of virtual storage devices, reconstructing the largest number of virtual storage devices, as directed by the user.

2. A method as in claim 1, including steps of
repeating said steps of determining a set of real storage devices, and determining an order to couple said set of real storage devices to said reliable distributed computing system.

3. A method as in claim 1, including steps of
determining one or more disk slots associated with said reliable distributed computing system in which to couple said set of real storage devices.

4. A method as in claim 1, wherein
each said virtual storage device has its data maintained with redundant data;
wherein
said loss of data still allows said reliable distributed computing system to recover data on each said virtual storage device in response to said redundant data.

5. A method as in claim 4, wherein
said redundant data includes one or more of:
error-correcting codes for said data;
multiple copies of said data;
spread-spectrum encoding of said data.

* * * * *